(12) United States Patent
Nogiwa

(10) Patent No.: US 7,163,089 B2
(45) Date of Patent: Jan. 16, 2007

(54) PAD CLIP OF DISC BRAKE APPARATUS

(75) Inventor: Junichi Nogiwa, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/865,886

(22) Filed: Jun. 14, 2004

(65) Prior Publication Data

US 2005/0274579 A1   Dec. 15, 2005

(51) Int. Cl.
*F16D 65/40* (2006.01)
(52) U.S. Cl. .................................... 188/73.38
(58) Field of Classification Search ............. 188/73.38
See application file for complete search history.

(56) References Cited

U.S. PATENT DOCUMENTS

| | | | |
|---|---|---|---|
| 4,371,060 A * | 2/1983 | Iwata ...................... | 188/73.38 |
| 4,512,446 A * | 4/1985 | Chuwman et al. ....... | 188/73.38 |
| 5,125,482 A * | 6/1992 | Negishi ................... | 188/73.38 |
| 5,261,508 A * | 11/1993 | Kikuchi ................... | 188/1.11 W |
| 5,381,875 A * | 1/1995 | Tsuruta et al. ........... | 188/73.38 |
| 5,472,067 A * | 12/1995 | Fujiwara ................. | 188/73.36 |
| 5,699,882 A * | 12/1997 | Ikegami et al. .......... | 188/73.38 |
| 5,941,348 A * | 8/1999 | Matsumoto et al. ..... | 188/73.38 |
| 5,947,233 A * | 9/1999 | Kobayashi et al. ...... | 188/72.3 |
| 5,954,163 A * | 9/1999 | Suzuki et al. ............ | 188/73.38 |
| 6,223,866 B1 * | 5/2001 | Giacomazza ............. | 188/73.38 |
| 6,269,915 B1 * | 8/2001 | Aoyagi .................... | 188/73.38 |
| 6,286,636 B1 * | 9/2001 | Iwata ...................... | 188/73.31 |
| 6,378,666 B1 * | 4/2002 | Yoko ....................... | 188/73.38 |
| 6,478,122 B1 * | 11/2002 | Demoise et al. ......... | 188/73.38 |
| 6,527,090 B1 * | 3/2003 | Barillot et al. ........... | 188/73.38 |

FOREIGN PATENT DOCUMENTS

| | | |
|---|---|---|
| JP | 8-226473 | 9/1996 |
| JP | 10-122278 | 5/1998 |

* cited by examiner

*Primary Examiner*—Robert A. Siconolfi
(74) *Attorney, Agent, or Firm*—Morgan, Lewis & Bockius, LLP

(57) ABSTRACT

A pad clip 12 is provided between a backing plate 6 and an engaging portion 4 of a support member 1 to prevent rattling of the backing plate 6 during non-braking period and generation of hitting sound during braking period. In order to restrain the hitting sound, the backing plate 6 is resiliently pressed in the rotational direction of the rotor by a pressing portion 14b and a second abutting portion 24. The above-described problem can be solved by increasing the force to press the backing plate 6 and reducing the possibility that a torque transmitting surface 16 on the backing plate 6 and a torque receiving surface 17 on the support member 1 hit against each other with great force is during braking period reduced correspondingly.

5 Claims, 10 Drawing Sheets

PAD CLIP OF DISC BRAKE APPARATUS

BACKGROUND OF THE INVENTION

The present invention relates a pad clip which is built in a disc brake apparatus of a motor vehicle and which is used to prevent rattling of a backing plate of a pad with respect to a support member during non-braking period, and to prevent the backing plate and the support member from hitting against each other with great force during braking period.

FIG. 1 shows a disc brake apparatus used for braking a motor vehicle. (Note that FIG. 1 shows a disc brake apparatus in which a pad clip according to the present invention is applied, and does not show a prior art.) The disc brake apparatus is fixed to a suspension device with a support member 1 provided adjacent to one side of a rotor (not shown) rotating with a wheel with bolts (not shown) screwed into mounting holes 2, 2 formed in the support member 1 in the radially inward direction of the rotor (lower side in FIG. 1) with respect to the support member 1. The support member 1 supports a caliper 3 so as to be capable of displacing in an axial direction of the rotor (in the direction penetrating a plane of FIG. 1) by engaging a pair of guide pins fixed to the caliper 3 and a pair of guide cylindrical portions (not shown) provided on the support member 1.

A pair of engaging portions 4, 4, is formed on part of the support member 1 at the positions away from each other in a rotational direction of the rotor at both ends with respect to the rotational direction of the rotor. These engaging portions 4, 4 are respectively bent at the extremities thereof into a U-shape so as to straddle the outer periphery of the rotor in the direction penetrating the plane of FIG. 1, and the both ends of a pair of pads 5 provided so as to interpose the rotor is supported by the engaging portions 4, 4. Each pad 5 is formed by adhering a lining 7 to one side of each backing plate 6, and is supported so as to be capable of sliding against the engaging portions 4, 4 in the axial direction of the rotor by allowing engaging projections 8, 8, formed at both ends of the backing plate 6 to engage with engaging grooves 9, 9 formed on the engaging portions 4, 4. Out of both sides of the engaging grooves 9, 9, the radially outer sides thereof with respect to the rotor are partitioned by projections 10, 10 formed so as to project toward the backing plate 6.

The caliper 3 having a cylinder and caliper claws 11 is disposed so as to straddle the pad 5, and is integrally provided with a piston for pressing the pad 5 toward the rotor in the cylinder. Further, pad clips 12, 12 are provided between the outer peripheral edge at both ends of the backing plate 6, which constitutes each pad 5, and the support member 1. Each of these pad clips 12, 12 is formed integrally of a metal plate having resiliency and resistance to corrosion, such as stainless steel plate, and plays a role to prevent generation of a hitting sound, which is referred to as "clonk" during braking period, by preventing the backing plate 6 of each pad 5 from rattling with respect to the support member 1 during non-braking period and preventing the backing plate 6 and the support member 1 from hitting against each other with great force during braking period. The pad clips 12, 12 each have a function to prevent the sliding portion between the respective backing plates 6 and the support member 1 from rusting.

Since the pad clips 12, 12, shown in FIG. 1, belongs to an embodiment of the present invention, a pad clip which is known in the related art will now be described referring to another drawing, FIG. 11. As the pad clip for restraining the hitting sounds, for example, the technologies described in JP-A-08-226473 and JP-A-10-122278 are known in the related art. FIG. 11 shows a pad clip 12a described in JP-A-10-122278 out of those two Patent Documents.

The pad clip 12a shown in FIG. 11 includes a positioning portion 13, a pressing portion 14 and an abutting portion 15. The positioning portion 13 is formed into substantially a C-shape, and engages with the projection 10 formed on part of the support member 1 so as to project toward the backing plate 6 (is fitted onto the projection 10) in order to maintain a positioning of the backing plate in a radial direction of the rotor. The pressing portion 14 is provided in the pad clip in radially inward direction of the rotor (lower side in FIG. 11) with respect to the positioning portion 13. One part (radially outer end in the radial direction of the rotor in the example in the drawing) of a torque transmitting surface 16 for transmitting the braking torque to the support member 1 is resiliently pressed by the end of the backing plate 6 in the rotational direction of the rotor (leftward in the example in the drawing). In addition, the abutting portion 15 is formed on the radially inwardly in the radial direction of the rotor with respect to the pressing portion 14. The abutting portion 15 abuts to one part of a torque receiving surface 17 that is one part of the support member 1 which faces the torque transmitting surface 16. At the radially inner end in the radial direction of the rotor, the extremity of an extending portion 18 formed on a portion continuing from the abutting portion 15 is resiliently abutted against the radially inner peripheral surface of the backing plate 6.

In the case of the pad clip 12a having the structure described above, the positioning portion 13 resiliently clamps the projection 10, and the extremity of the extending portion 18 resiliently abuts against the inner peripheral surface of the backing plate 6, so that rattling of the backing plate 6 with respect to the support member 1 during non-braking period is prevented. Since the pressing portion 14 presses the backing plate 6 in the rotational direction of the rotor, hitting the torque transmitting surface 16 and the torque receiving surface 17 against each other with great force during braking period can be prevented.

In other words, since displacement of the backing plate 6 with respect to the support member 1 is enabled, there exists a space between the both surfaces 16, 17. When the brake is put on, the both surfaces 16, 17 existing in the anchor side (front side in the rotational direction of the rotor) is brought into abutment via one part of the pad clip 12a by a brake torque exerted to the backing plate 6 in association with friction between the side surface of the rotor and the lining 7 (see FIG. 1) adhered on the backing plate 6. In this state, the brake torque exerted on the pad 5 is supported by the support member 1. When the brake is put on, in which the above-described state is resulted, if the torque transmitting surface 16 and the torque receiving surface 17 hit against each other with great force (via pat of the pad clip 12a), the hitting sound is generated. In contrast, since the pressing portion 14 presses the backing plate 6 in the direction of circumference of the rotor, hitting between the both surfaces 16, 17 is alleviated, and hence generation of hitting sound may be restrained.

Although not shown in the drawing, in JP-A-08-226473, there is shown a structure in which the pressing portion is provided at a radial end in the radial direction of the rotor at the portion deviated from the torque transmitting surface and the torque receiving surface, and the backing plate or the support member is pressed by the pressing portion in the radial direction the rotor. However, in the case of the invention stated in JP-A-08-226473 described above, there is no structure for pressing the backing plate between the torque transmitting surface and the torque receiving surface.

In the case of the structure shown in FIG. 11, it is difficult to increase a force of the pressing portion 14 pressing the backing plate 6 toward the center of the support member 1. Therefore, as in the case in which brake is put on relatively suddenly, when the brake torque exerted to the backing plate 6 during braking period is large, generation of hitting sound cannot be necessarily restrained satisfactorily. In other words, in the case of the structure in the related art shown in FIG. 11, the angle a formed between a pressing strip 22 having the pressing portion 14 and the abutting portion 15 at both ends thereof and the torque transmitting surface 16 and the torque receiving surface 17 is about 1 to 5° in the free state. When pressing the backing plate 6 only by the pressing portion 14 in this structure, the above-described force could not be necessarily increased, and the effect to restrain generation of the hitting sound has not been sure. Such a problem also occurs in the case of the structure described in JP-A-08-226473. When the above-described angle a is increased to about 6 to 10° in the free state, the effect to prevent generation of the hitting sound might increase, but instead, workability in assembling the pad 5 to the support member 1 may be lowered, or resistance generated when the pad 5 slides against the support member 1 increases during braking period and when releasing the brake. Therefore, it is difficult to employ this structure.

SUMMARY OF THE INVENTION

In view of such circumstances, the present invention intends to realize a pad clip of a disc brake apparatus which can provide the effect to prevent generation of the hitting sound sufficiently and stably.

A pad clip according to the present invention is provided between an end of a backing plate of a pad in a rotational direction of the rotor and an engaging portion of a support member.

In particular, the pad clip according to the present invention includes a positioning portion of a substantially C-shape extending so as to follow a projection of the support member, a pressing portion provided on the inwardly with respect to the positioning portion in the radial direction of rotor for pressing part of a torque transmitting surface for transmitting a braking torque to the support member from the end of the backing plate in the rotational direction of the rotor, and a first abutting portion abutting against part of a torque receiving surface of the support member existing on the inwardly with respect to the pressing portion in the radial direction of the rotor and facing the torque transmitting surface.

In addition, a second abutting portion for pressing the portion deviated from the torque receiving surface in the rotational direction of the rotor at least during braking period is provided at the portion deviated from the pressing portion.

Since the pad clip according to the present invention is configured as described in the above, rattling of the pad with respect to the support during non-braking period is prevented, an abutting of the torque transmitting surface and the torque receiving surface with great force during braking period is prevented, and a generation of hitting sounds caused by hitting of the both surfaces with respect to each other is restrained.

In particular, in the case of the disc brake pad clip of the present invention, a force to press the backing plate of the pad in the direction of circumference of the rotor is the sum of a resilient force of the first pressing portion and a resilient force of the second abutting portion. Therefore, generation of hitting sound during braking period can be sufficiently restrained by securing these forces sufficiently.

Since the pressing portion and the second abutting portion are provided independently from each other, a force to press the backing plate of the pad by the pressing portion and the second abutting portion in the direction of the circumference of the rotor may be increased and stabilized. Therefore, the effect to restrain generation of the hitting sound is stabilized.

BRIEF DESCRIPTION OF THE DRAWINGS

FIG. 1 is a front view of a disc brake in which a pad clip of a first embodiment of the present invention is built in.

DESCRIPTION OF THE PREFERRED EMBODIMENT

Figure 1:
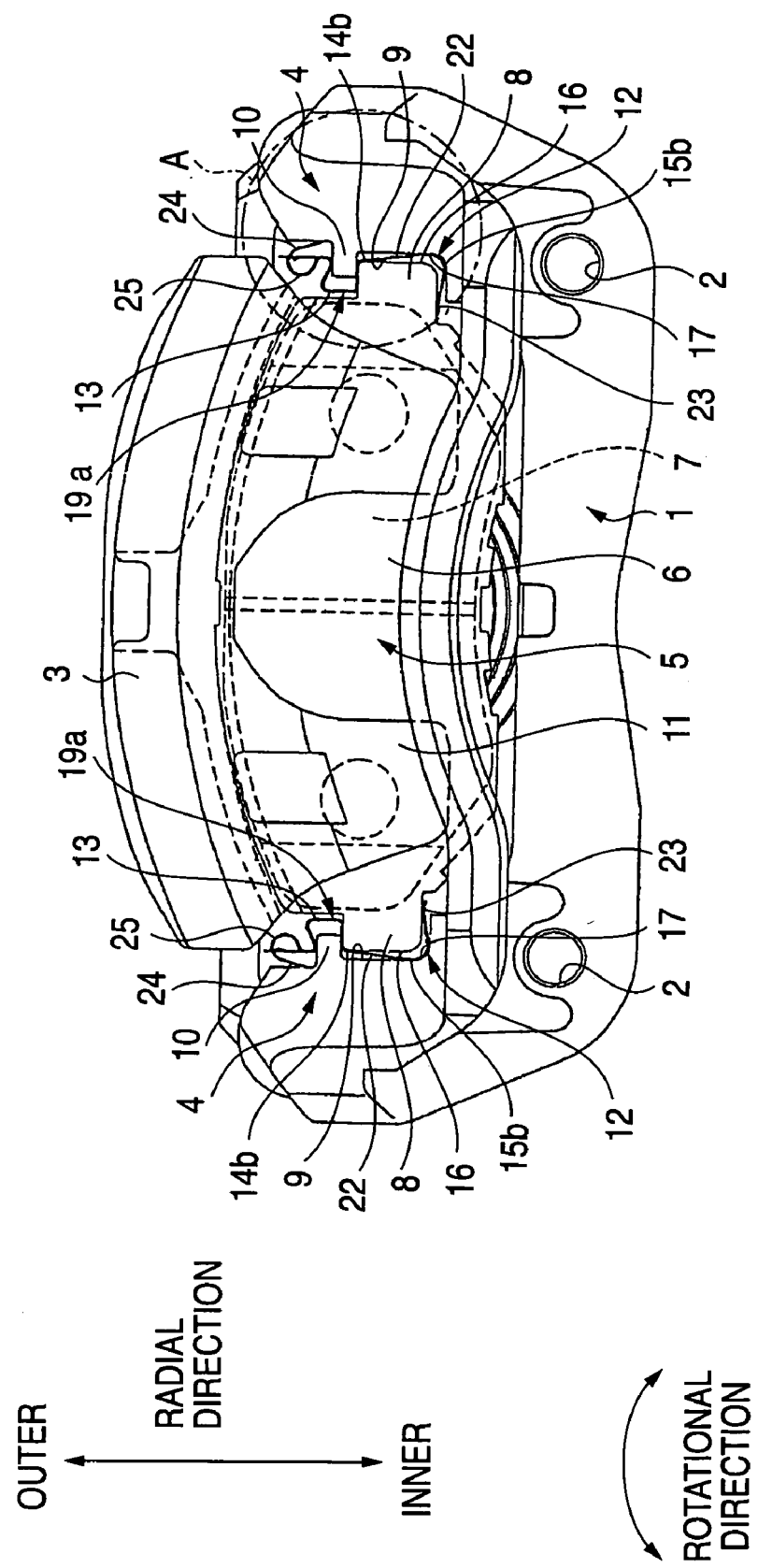
Figure 2:
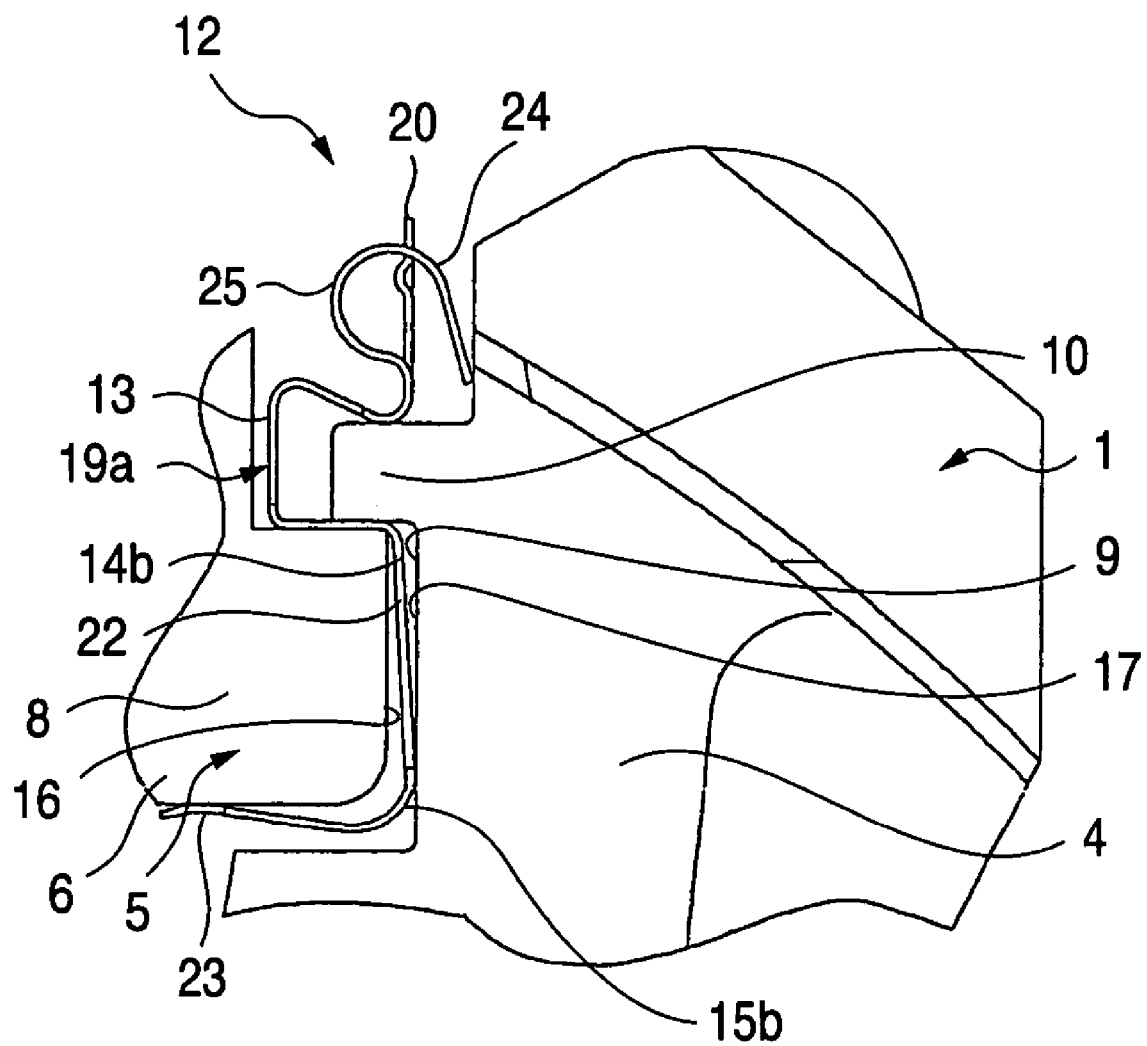
FIG. 2 is an enlarged view of the portion A in FIG. 1.
Figure 3:
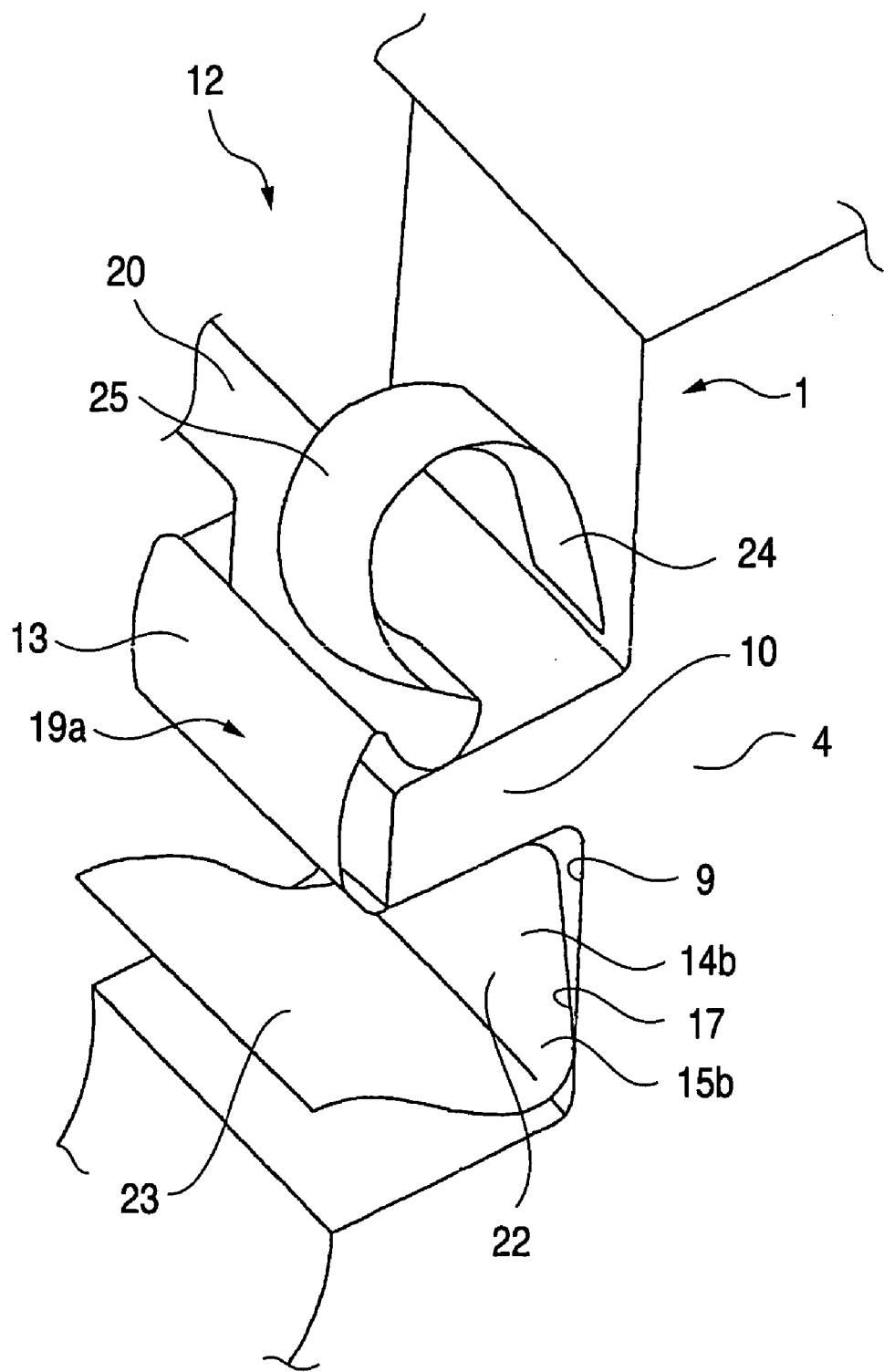
FIG. 3 is an enlarged perspective view showing the portion A in FIG. 1, in as state in which a support member and a pad clip are taken out.
Figure 4:
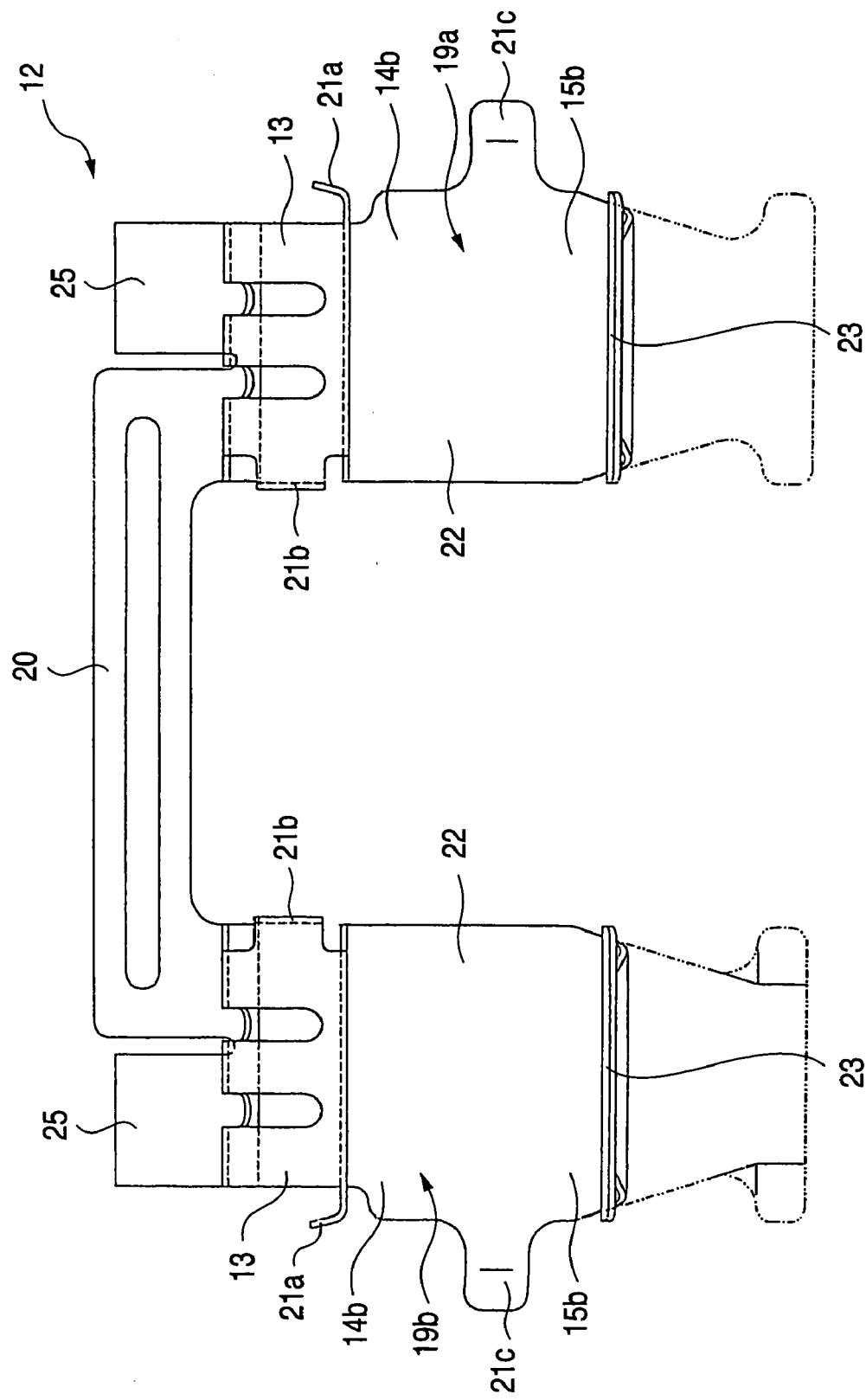
FIG. 4 is the pad clip on the right side in FIG. 1, when viewed from the left side of the drawing.
Figure 5:
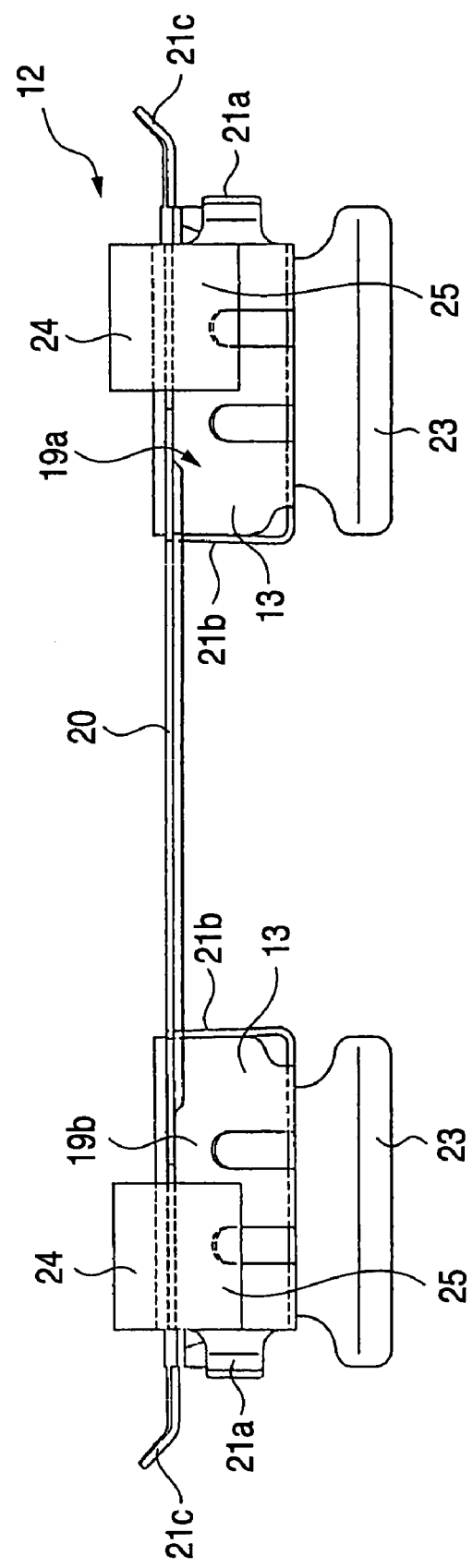
FIG. 5 is the pad clip in FIG. 4 viewed from above.

Referring now to FIG. 1 to FIG. 6, a first embodiment of the present invention will be described. The characteristic of the present invention is in that the hitting sound generated during braking period is stably restrained by devising the shape of the pad clips 12, 12 provided between both ends of the backing plate 6 of the pad 5 and both ends of the support member 1 with respect to the rotational direction of the rotor. Since the overall structure of the disc brake apparatus to which the pad clips 12, 12 are assembled is as described above, duplicated description is omitted or simplified, and the characteristic aspects of the present invention are mainly described.

The pad clip 12 of this example is formed by bending a metallic plate having resiliency and resistance to corrosion, such as stainless steel plate. In the case of this example, the pad clip 12 is formed integrally by connecting an outer (the side of the widthwise end of the vehicle body with respect to an axial direction of the rotor when assembled to the vehicle, and the nearer side of FIG. 1) element 19a and an inner (the center side of the vehicle body with respect to the same, and the far side in FIG. 1) element 19b by a connecting portion 20. The outer element 19a and the inner element 19b have basically the same structure, and the pair of pad clips 12, 12 provided at both ends of the support member 1 also has basically the same structure. Therefore, the structure of the pad clip 12 of the outer element 19a and of the right side in FIG. 1 will be described below.

The element 19a is provided with the positioning portion 13, the pressing portion 14b, and the abutting portion 15b. The positioning portion 13 engages the projection 10 formed on one part of the support member 1 so as to project toward the backing plate 6 in order to maintain a positioning of the backing plate 6 in the radial direction to the rotor. The positioning portion 13 has a substantially C-shape. In other words, the positioning portion 13 is provided with a resilient force in the direction to narrower the opening in the free state. The positioning portion 13 is provided at both edges thereof in the axial direction of the rotor with tongues 21a, 21b (omitted in FIGS. 1 to 3) bent inwardly of the substantially angular C-shape, respectively. The positioning portion 13 as described above resiliently clamps the projection 10 in a state of being mounted to the support member 1 and maintains radial positioning of the pad clip 12. At the same time, the projection 10 is clamped by the both tongues 21a, 21b to maintain the axial positioning of the pad clip 12.

Figure 6:
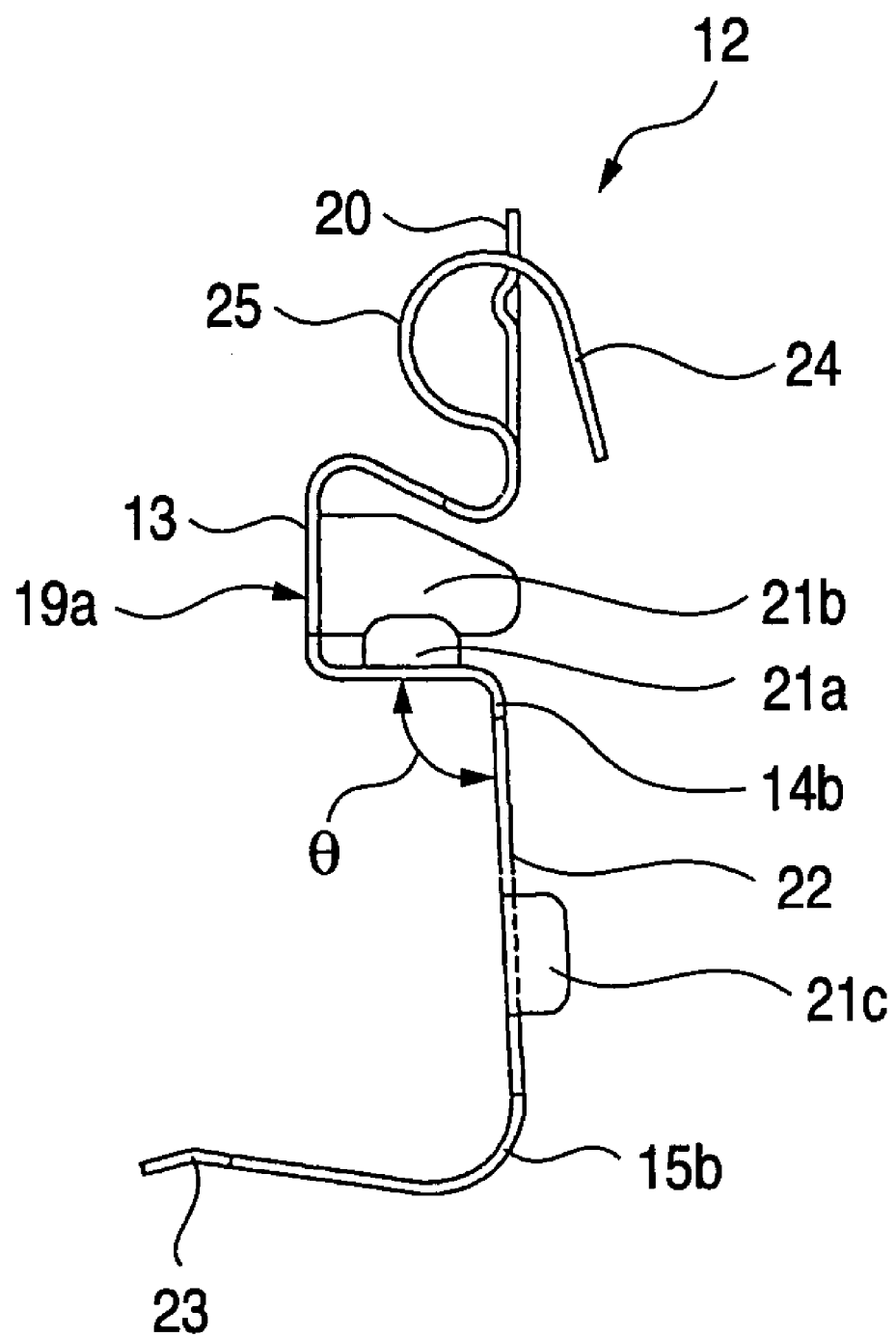
FIG. 6 is the pad clip in FIG. 4 viewed from the right side.

The pressing portion 14b is provided inwardly with respect to the positioning portion 13 in the radial direction of the rotor. In other words, the pressing strip 22 is extending continuously from radially inner end of the positioning portion 13. The bent angle of the pressing strip 22 with respect to the inner end of the positioning portion 13 is less than 90 degrees. In other words, as shown in FIG. 6, the angle θ formed between the radially inner end of the positioning portion 13 and the pressing strip 22 in the free state is an obtuse angle (θ>90 degrees). Therefore, the pressing strip 22 urges toward both of the torque receiving surface 17 provided on the engaging groove 9 of the engaging portion 4 at both ends of the support member 1 and the torque transmitting surface 16 of the backing plate 6 in a state in which the pad clip 12 is mounted to the disc brake. Then, the pressing portion 14b of the pressing strip 22 at the radially outer end abuts against the torque transmitting surface 16, and the abutting portion 15b of the radially inner end abuts against the torque receiving surface 17 respectively.

In other words, the pressing portion 14b is located in the vicinity of the portion continued from the positioning portion 13 at the radially outer end of the pressing strip 22, and the abutting portion 15b is located in the vicinity of the portion continued from a pressing strip for radially pressing 23, which will be described next, at the radially inner end of the pressing strip 22. The pressing portion 14b as described above resiliently presses one part of the torque transmitting surface 16 in the rotational direction of the rotor in a state in which the pad clip 12 is mounted to the disc brake apparatus. In the example shown in the drawing, a tongue 21c (omitted in FIGS. 1 to 3) is also formed at the middle of the pressing strip 22 so as to face the outer surface of the engaging portion 4 for maintaining the axial positioning. The pressing strip for radially pressing 23 is projecting toward the center of the support member 1 from the inner end of the pressing strip 22. The extremity of the pressing strip for radially pressing 23 abuts against the inner peripheral surface of the backing plate 6 in a state in which the pad clip 12 is mounted to the disc brake apparatus, so that the backing plate 6 is prevented from rattling with respect to the support member 1 during non-braking period.

In addition, in the case of the pad clip 12 of this example, a second abutting portion 24 is provided at the portion deviated from the pressing portion 14b. The second abutting portion 24 provides a resilient force in the rotational direction of the rotor to the backing plate 6 by pressing the portion deviated from the torque receiving surface 17 which is one part of the support member 1 in the rotational direction of the rotor at least during braking period. In the case of this example, the second abutting portion 24 is one part of the metallic plate constituting the pad clip 12 and is a portion extending from a curved portion 25 formed by bending the portion located radially outwardly with respect to the positioning portion 13 into an arcuate shape.

In other words, the proximal portion of the curved potion 25, which is part of the metallic plate and curved so that the radially outside portion and the center side of the support member 1 project with respect to the above-described radial direction, is continued from the upper end of the positioning portion 13. In addition, the extremity of the portion extending straight from the extremity of the curved portion 25 serves as the second abutting portion 24. The second abutting portion 24 abuts against the outside portion of the projection 10 at a part of the engaging portion 4 which constitutes the support member 1 in a state in which the pad clip 12 is mounted to the disc brake. When mounting the pad clip 12 to the disc brake, it is also possible to resiliently deform the curved portion 25 to allow the second abutting portion 24 to resiliently bring into abutment against the engaging portion 4. Therefore, the second abutting portion 24 provides a resilient force in the rotational direction of the rotor to the positioning portion 13 of the pad clip 12 as the backing plate 6 approaches the engaging portion 4 during braking period (in the case in which the second abutting portion 24 is simply brought into abutment against the engaging portion 4 without resiliently deforming the curved portion 25 during non-braking period in the assembled state), or from the beginning (in the case in which the second abutting portion 24 is brought into resilient abutment against the engaging portion 4 by resiliently deforming the curved portion 25 during non-braking period in the assembled state).

The effects of the pad clip 12 of this example described above to prevent the backing plate 6 of the pad 5 from rattling with respect to the support member 1 during non-braking period and to prevent the torque transmitting surface 16 and the torque receiving surface 17 from abutting against each other with great force during braking period to restrain generation of the hitting sound caused by hitting the both surfaces 16, 17 against each other are attained.

Figure 7:
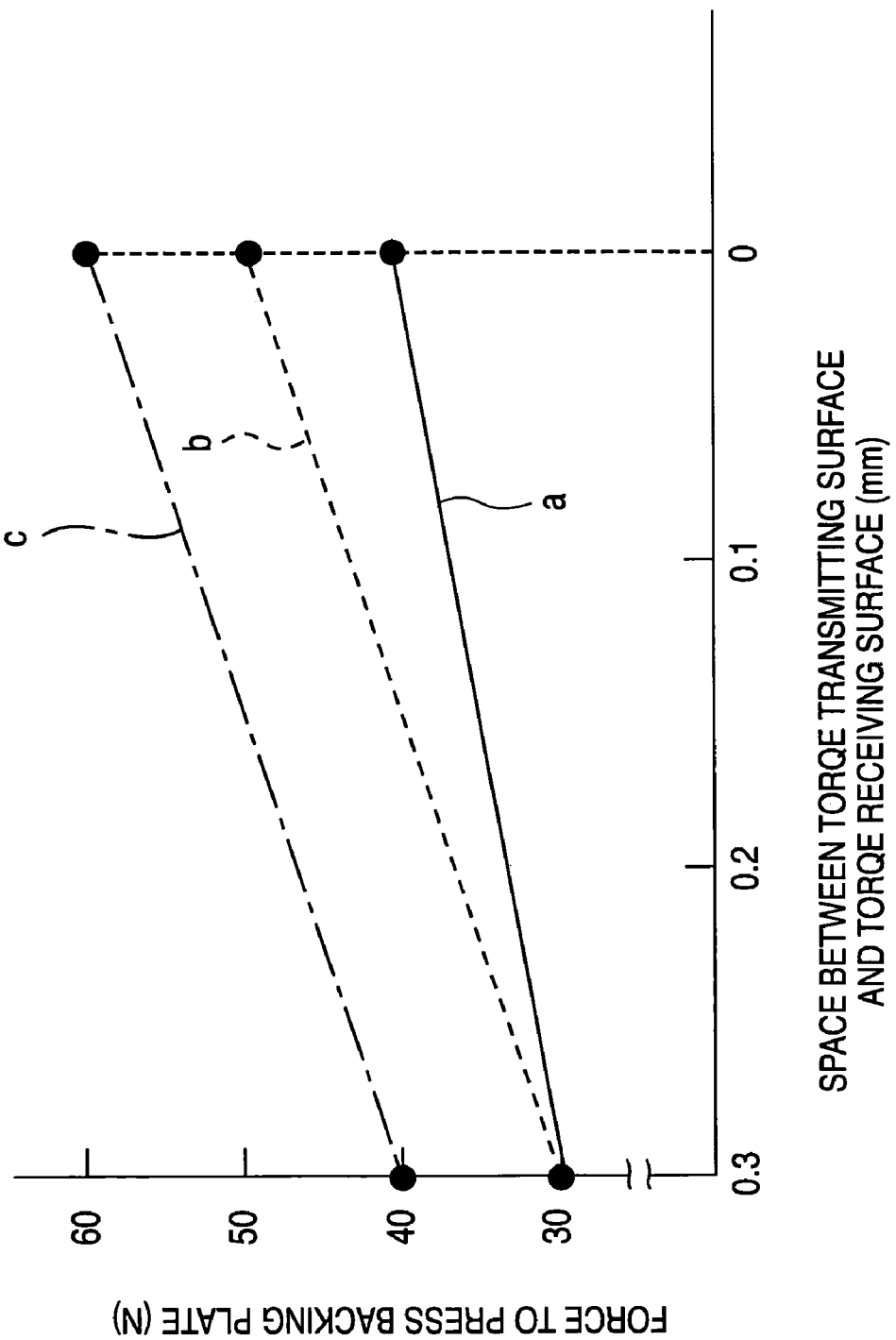
FIG. 7 is a graph for explaining the magnitude of a force of the pad clip which presses a backing plate of a pad.

In particular, in the case of the pad clip 12 of this example, a force to press the backing plate 6 of the pad 5 in the rotational direction of the rotor is the sum of the resilient force of the pressing portion 14 and the resilient force of the second abutting portion 24. Referring now to FIG. 7, this point will be described. In the case of the structure in the related art shown in FIG. 11, since the backing plate 6 is pressed only by the resilient force of the pressing portion 14, a force to press the backing plate 6 in the rotational direction of the rotor against the brake torque during braking period is as shown by a solid line "a" in FIG. 7, which does not increase so much. In contrast, in the case of the pad clip 12 of this example, the force to press the backing plate 6 in the rotational direction of the rotor is as shown by a broken line "b" or a chain dash "c" in FIG. 7, which is the sum of the resilient force of the pressing portion 14b and the resilient force of the second abutting portion 24. The broken line "b" represents the case where the curved portion 25 is not resiliently deformed and the second abutting portion 24 is simply brought into abutment with the engaging portion 4 during non-braking period in the assembled state, and the chain dash "c" represents the case in which the curved portion 25 is resiliently deformed and the second abutting portion 24 is brought into resilient abutment with the engaging portion 4 from the beginning during non-braking period in the assembled state, respectively. As is clear from FIG. 7, in the case of the pad clip 12 of this embodiment, the force to press the backing plate 6 of the pad 5 in the rotational direction of the rotor can be increased to enhance the effect to restrain the hitting sound generated during braking period.

Figure 11:
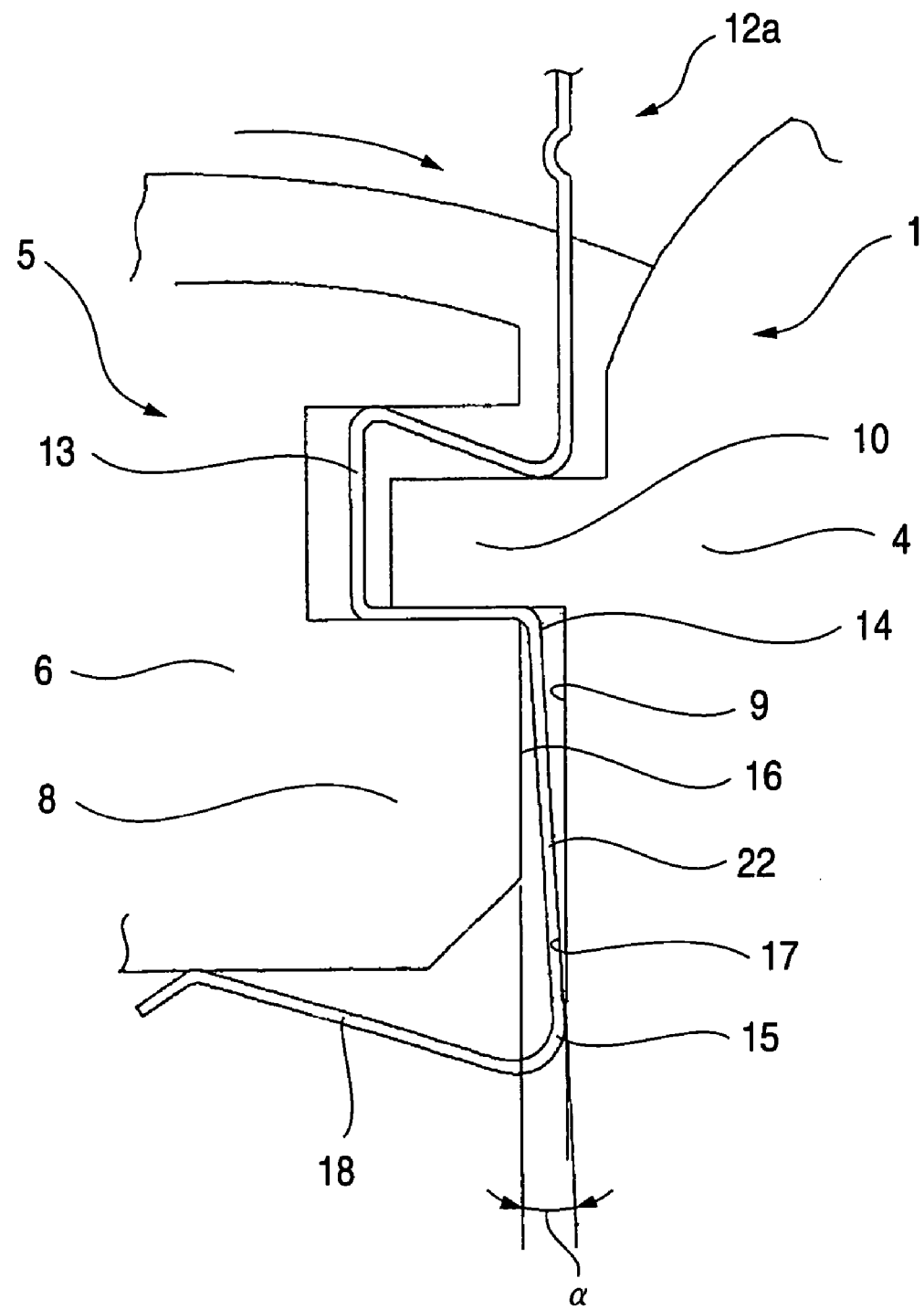
FIG. 11 is a drawing similar to FIG. 2, showing an example of the structure in the related art.

The pad clip 12 according to this embodiment is different from the structure in the related art shown in FIG. 11 described above, and the pressing portion 14b and the second abutting portion 24 are provided independently from each other so as to interpose the positioning portion 13. Therefore, the pressing portion 14b and the second abutting portion 24 can increase and, furthermore, stabilize the force to press the backing plate 6 of the pad 5 in the rotational direction of the rotor. Consequently, the effect to restrain generation of the hitting sound is stabilized.

Figure 8:
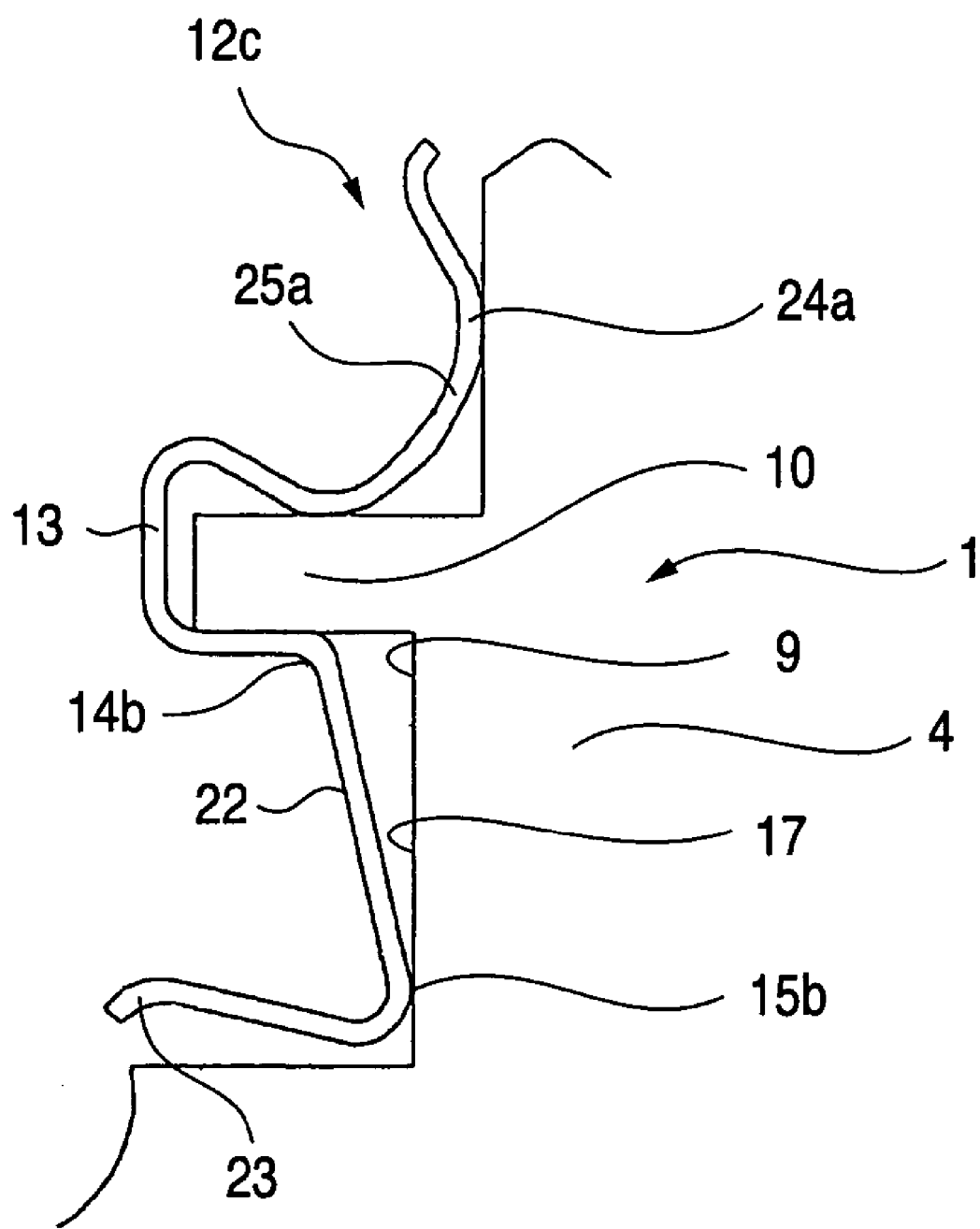
FIG. 8 is a drawing similar to FIG. 2, showing a second embodiment of the present invention.

Subsequently, FIG. 8 shows a second embodiment of the present invention. In this embodiment, a second abutting portion 24a corresponds to an intermediate portion of a curved portion 25a formed by bending part of the metallic plate constituting a pad clip 12c, which corresponds to a portion being located radially outwardly with respect to the positioning portion 13, into an arcuate shape.

In other words, part of the metallic plate, which corresponds to the upper end of the positioning portion 13 with respect to the radial direction described above, is curved in the direction in which the radially inside and the end of the support member 1 protrude, and the proximal portion of the curved portion 25a is continued therefrom. Then, the intermediate portion of the curved portion 25a is served as the second abutting portion 24a, and the second abutting portion 24a is brought into abutment with the engaging portion 4 provided at the end of the support member 1. The structure and the effect of other portions are the same as the first embodiment described above.

Figure 9:
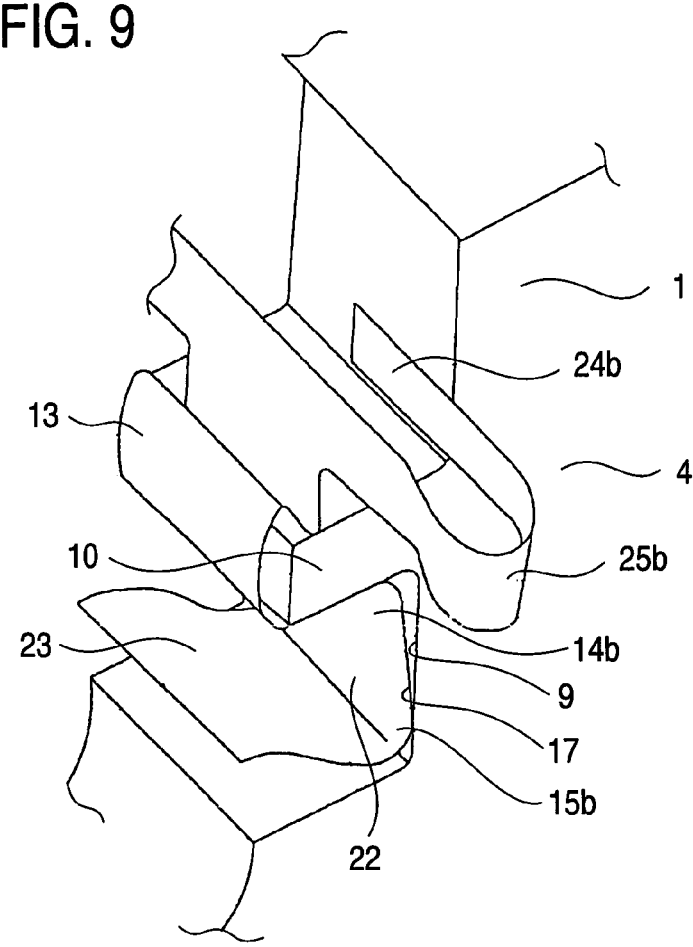
FIG. 9 is a drawing similar to FIG. 3, showing a third embodiment.

Subsequently, FIG. 9 shows a third embodiment of the present invention. In this embodiment, the bending portion 25b is formed in the direction projecting from the outer surface of the engaging portion 4 provided at the end of the support member 1. Then, the extremity of the portion formed from the extremity of the curved portion 25b so as to linearly continue is brought into abutment with the engaging portion 4 as the second abutting portion 24b. The structure and the effect of other portions are the same as the first embodiment described above.

Figure 10:
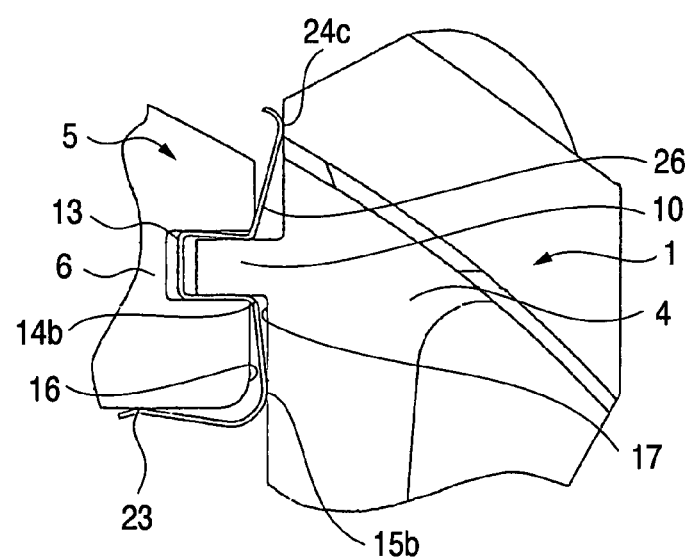
FIG. 10 is a drawing similar to FIG. 2, showing a fourth embodiment.

Subsequently, FIG. 10 shows a fourth embodiment of the present invention. In this embodiment, a second pressing portion 26 is provided on the radially inwardly of the rotor with respect to a second abutting portion 24c. The second pressing portion 26 presses part of the end surface, which is located radially outwardly with respect to the positioning portion 13, of the backing plate 6 of the pad 5 in the direction of circumference of the rotor. The structure and the effect of other portions are the same as the first embodiment described above.

Since the pad clip of the present invention is configured and hence acts as described above, the force to press the backing plate of the pad in the rotational direction of the rotor can be increased stably. Therefore, the hitting sound generated during braking period can be restrained stably.

What is claimed is:

1. A pad clip of a disc brake apparatus, provided between an end of a backing plate of a pad in a rotational direction of a rotor and an engaging portion of a support member, comprising:
   a positioning portion formed in a substantially C-shape extending to follow a projection of the support member;
   a pressing portion, formed inwardly with respect to the positioning portion in a radial direction of the rotor, for pressing a part of a torque transmitting surface formed on an end of the backing plate in the rotational direction of the rotor, and for transmitting a braking torque to the support member from the end of the backing plate in the rotational direction of the rotor;
   a first abutting portion abutting against a part of a torque receiving portion, wherein the torque receiving portion is formed in the support member inwardly with respect to the pressing portion in the radial direction of the rotor and facing to the torque transmitting surface; and
   a second abutting portion, formed at a portion positioned radially outwardly with respect to the positioning portion in the radial direction of the rotor, for pressing the support member at least during a braking period.

2. The pad clip according to claim 1, wherein the second abutting portion comprises a curved portion.

3. The pad clip according to claim 1, further comprising a curved portion formed by bending a portion located outwardly with respect to the positioning portion in the radial direction of the rotor, wherein the second abutting portion comprises a portion extending further from the curved portion.

4. The pad clip according to claim 1, further comprising a second pressing portion, existing radially inwardly with respect to the second abutting portion, for pressing a part of an end surface of the backing plate positioned radially outwardly with respect to the positioning portion in the radial direction of the rotor.

5. The pad clip according to claim 1, wherein the portion at which the second abutting portion is formed is deviated from the positioning portion outwardly in the radial direction of the rotor.

* * * * *